Figure 2:
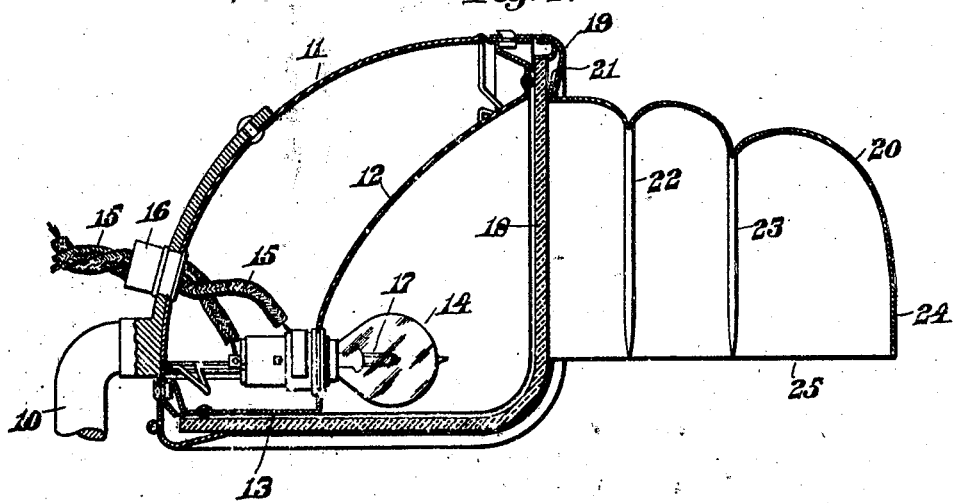

C. G. MELANSON.
HEADLIGHT.
APPLICATION FILED AUG. 16, 1921.

1,428,110. Patented Sept. 5, 1922.

Inventor:
Charles G. Melanson,
by Walter E. Lombard.
Atty.

Patented Sept. 5, 1922.

1,428,110

UNITED STATES PATENT OFFICE.

CHARLES GILBERT MELANSON, OF LYNN, MASSACHUSETTS.

HEADLIGHT.

Application filed August 16, 1921. Serial No. 492,807.

*To all whom it may concern:*

Be it known that I, CHARLES G. MELANSON, a citizen of the United States of America, and a resident of Lynn, in the county of Essex and State of Massachusetts, have invented certain new and useful Improvements in Headlights, of which the following is a specification.

This invention relates to headlights particularly adapted for use on motor vehicles and has for its object the provision of a device of this character which will project an intensified light on the road at the desired distance in front of the vehicle and which will also illuminate the intermediate space in advance of the vehicle.

Another object of the invention is to provide a headlight which will illuminate the road beneath said headlight.

A further object of the invention is to provide said headlight with an opaque vizor which will reflect a portion of the rays projected from the lamp onto the main reflector.

The invention consists primarily of a headlight having an angular lens through which the lamp rays may be projected both forwardly and downwardly.

The invention further consists in a headlight vizor having curved mirrored surfaces on the inner face thereof adapted to reflect a portion of the lamp rays rearwardly against the reflector of said headlight.

The invention further consists of certain novel features of construction and arrangement of parts which will be understood readily by reference to the description of the drawings and to the claims to be hereinafter given.

For the purpose of illustrating the invention, one preferred form therof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Figure 1:
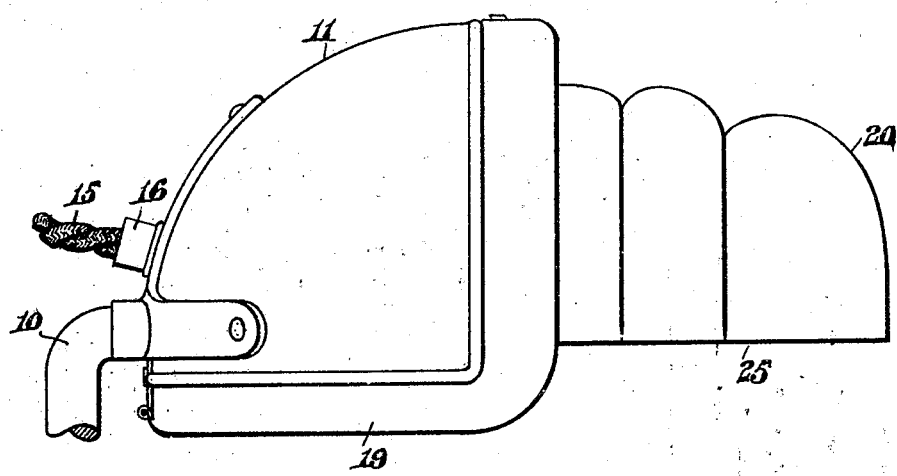

Of the drawings:

Figure 1 represents a side elevation of a headlight embodying the principles of the present invention, and Figure 2 represents a longitudinal vertical section of the same.

Similar characters indicate like parts throughout the several figures of the drawings.

In the drawings, 10 is the usual headlight support adapted to be secured to a motor vehicle and having attached to its upper end the casing 11 which is open at the front and the bottom.

Within the casing 11 is a reflector 12 which extends from a point near the upper front end of the casing 11 to the bottom thereof.

The lower end of the reflector 12 has a rearwardly projecting extension 13.

Axially disposed in the casing 11 and supported in the reflector 12 near its lower horizontal extension 13, is the lamp 14 to which electric current is supplied through the wires 15 extending outwardly through a tubular member 16 mounted in the casing 11.

In order to get the best results from the lamp 14, the filament thereof is disposed vertically therein.

The front and bottom of the casing 11 is normally closed by means of an angular clear lens 18 which is secured in position by means of the retaining ring 19 which may be locked to the casing 11 in any well-known manner.

In front of the lens 18 is a vizor 20, the rear end of which has a flange 21 inserted between said lens 18 and the front part of the retaining ring 19.

The vizor 20 is provided with a plurality of curved depressions formed by the inwardly extending ridges 22, 23 and the front wall 24.

This front wall has a portion thereof vertical and the entire inner surface of the vizor 20 is mirrored so that a great part of the illuminating rays from the lamp 14 projected onto said mirrored surface are reflected rearwardly onto the reflector 12 from which they are projected forwardly in advance of the vehicle.

By means of this duplex reflection, the rays finally projected through the lens 18 are greatly intensified.

The lower edge 25 of the vizor 20 is approximately opposite the center of the lamp 14 and slightly above the lower extension 13 of the reflector 12 so that both direct rays and rays deflected from the vizor 20 are projected forwardly from the reflector 12 in a horizontal strata which will illuminate the road far ahead of the car while other rays from said reflector will be projected upon the road between the vehicle and the intensely illuminated portion of the road far in advance of the car.

As the vizor 20 is opaque, no illuminating rays from the lamp 14 can be projected upwardly into the eyes of approaching pedestrians or onto the windshield of an approaching car.

It is obvious the vizor 20 may be provided with any desired number of ridges 22, 23.

By having the lens 18 extend rearwardly beneath the open end of the reflector 12, the road beneath the front of the car is illuminated.

This makes a very inexpensive form of headlight for motor vehicles which has the advantage of concentrating the lamp rays where most needed and intensely illuminating the road at the required distance in advance of the vehicle.

It is believed that the invention will be thoroughly understood from the foregoing without further description.

Having thus described my invention, I claim—

1. The combination with a casing open at the front and bottom, a reflector within said casing having a horizontal rearward extension; a lamp socket supported by said reflector and parallel to said extension; a lamp in said socket; an angular lens supported by said casing and closing the front and bottom thereof, the bottom portion of said lens being closely adjacent said lamp; and a vizor in front of said lens, the lower edge of which is in alinement with the axis of said lamp.

2. The combination with a casing open at the front and bottom, a lamp positioned therein at the rear and near the bottom; a reflector within said casing extending over the interior wall thereof; a clear lens closing the front and bottom of said casing; and a vizor in front of said reflecting surface and having a plurality of depressions in the rear face thereof each provided with a mirrored surface adapted to deflect certain of the lamp rays against said reflector.

3. The combination with a casing open at the front and bottom, a lamp positioned therein at the rear and near the bottom; a reflector within said casing extending over the interior wall thereof; a clear lens closing the front and bottom of said casing; and a vizor in front of said reflecting surface and having a plurality of concaved depressions in the rear face thereof each provided with a mirrored surface adapted to deflect certain of the lamp rays against said reflector.

4. The combination with a casing open at the front and bottom; a lamp positioned therein at the rear and near the bottom; a reflector within said casing extending over the interior wall thereof; a clear lens closing the front and bottom of said casing; and a vizor in front of said reflecting surface and having a plurality of depressions in the rear face thereof each provided with a mirrored surface, said depressions being parallel with the front of said casing.

Signed by me at 294 Washington St., Boston, Mass., this 15th day of August, 1921.

CHARLES GILBERT MELANSON.

Witnesses:
WALTER E. LOMBARD,
NATHAN C. LOMBARD.